United States Patent
Lee

(10) Patent No.: US 8,451,377 B2
(45) Date of Patent: May 28, 2013

(54) IMAGE DISPLAY DEVICE, METHOD OF CONTROLLING THE SAME AND HOME NETWORK SYSTEM

(75) Inventor: Jae Kyung Lee, Daegu-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/037,922

(22) Filed: Mar. 1, 2011

(65) Prior Publication Data

US 2011/0154430 A1   Jun. 23, 2011

Related U.S. Application Data

(63) Continuation of application No. 11/405,620, filed on Apr. 18, 2006, now Pat. No. 7,929,055.

(30) Foreign Application Priority Data

Apr. 18, 2005  (KR) .................. 10-2005-0031899

(51) Int. Cl.
  *H04N 5/44*  (2006.01)
  *H04N 5/445* (2006.01)

(52) U.S. Cl.
  USPC ........... 348/553; 348/552; 348/739; 348/725; 348/14.04; 725/51

(58) Field of Classification Search
  USPC ........... 348/552, 553, 14.04, 725, 729, 423.1, 348/563, 473, 474, 739; 725/51, 54, 109, 725/80, 81, 133, 153, 141
  See application file for complete search history.

(56) References Cited

U.S. PATENT DOCUMENTS

| | | | |
|---|---|---|---|
| 6,005,861 A | 12/1999 | Humpleman | |
| 6,806,913 B2 | 10/2004 | Kim et al. | |
| 6,961,099 B2 * | 11/2005 | Takano et al. | 348/705 |
| 7,039,936 B1 | 5/2006 | Inoue et al. | |
| 7,089,321 B2 | 8/2006 | Hayashi | |
| 7,260,829 B1 | 8/2007 | Hendricks et al. | |
| 2003/0056225 A1 | 3/2003 | Bione | |

FOREIGN PATENT DOCUMENTS

| | | |
|---|---|---|
| EP | 0369382 A2 | 5/1990 |
| EP | 1355451 A2 | 10/2003 |
| KR | 10-2004-0104349 A | 12/2004 |
| WO | 01/09739 A1 | 2/2001 |

\* cited by examiner

*Primary Examiner* — Jefferey Harold
*Assistant Examiner* — Jean W Desir
(74) *Attorney, Agent, or Firm* — Birch, Stewart, Kolasch & Birch, LLP

(57) ABSTRACT

An image display device and a home network system are provided. The image display device transmits a broadcasting signal including at least one of a video data, an audio data, and an additional data according to predetermined transmission conditions. The home network system includes at least one external device connected to the image display unit through a wire or wireless network to output the transmitted broadcasting signal.

11 Claims, 3 Drawing Sheets

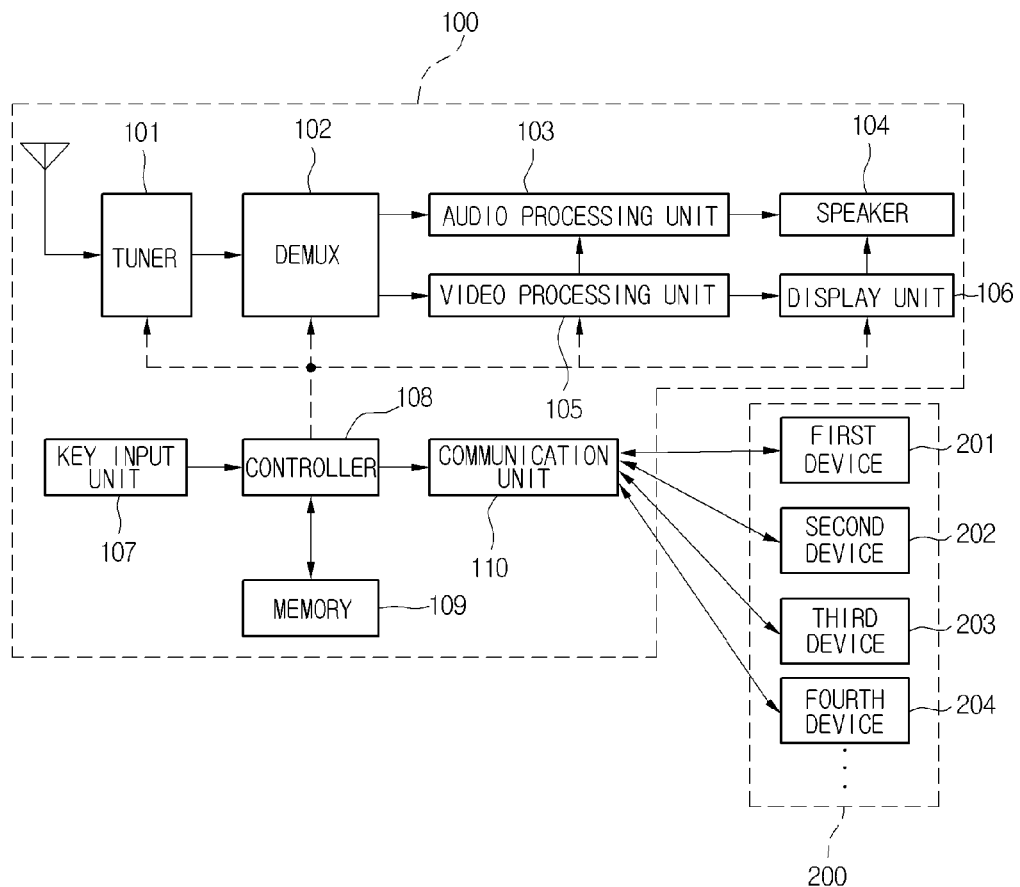

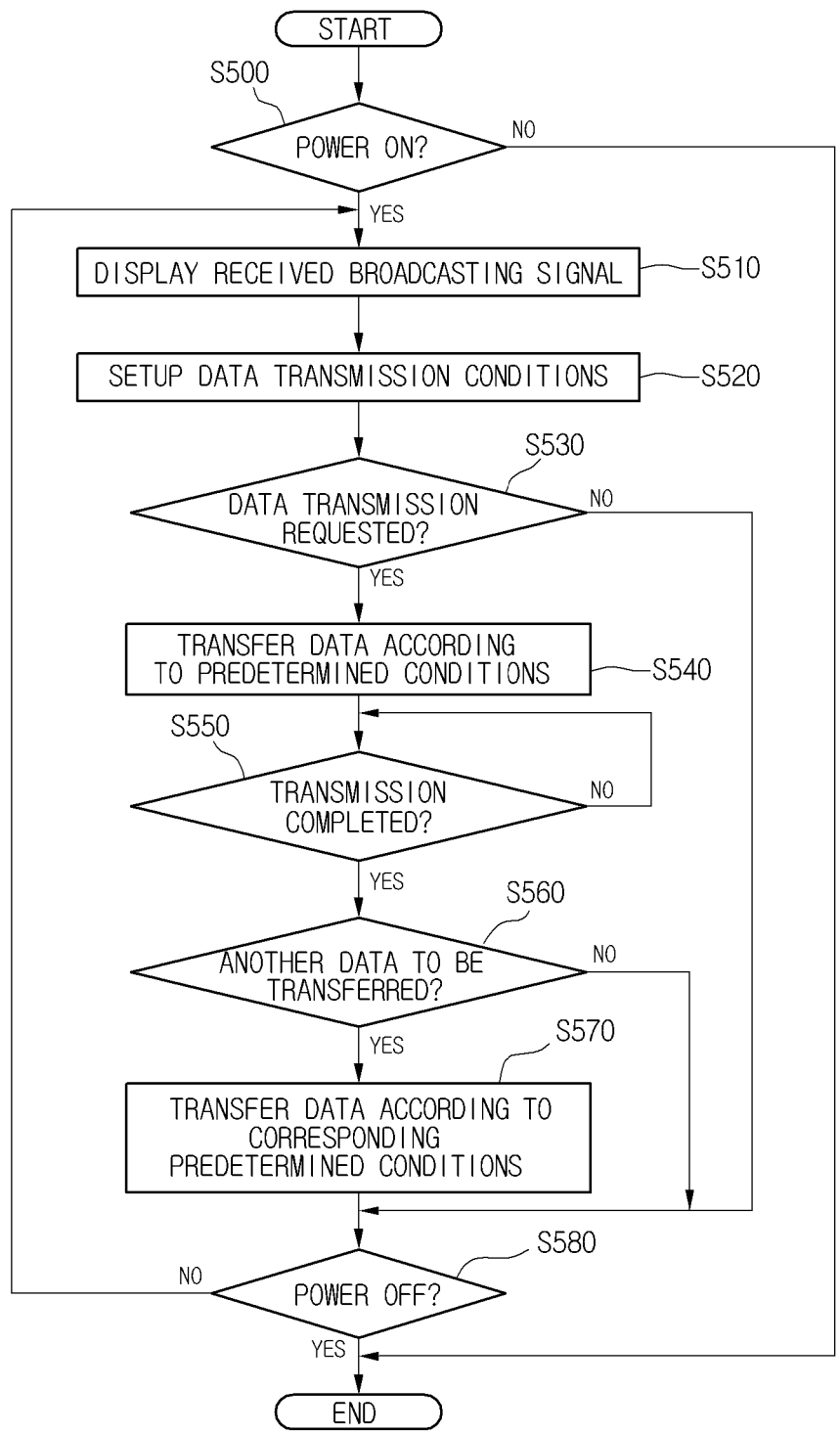

IMAGE DISPLAY DEVICE, METHOD OF CONTROLLING THE SAME AND HOME NETWORK SYSTEM

CROSS-REFERENCE TO RELATED APPLICATIONS

This application is a Continuation of application Ser. No. 11/405,620 filed on Apr. 18, 2006, now U.S. Pat. No. 7,929,055 which claims priority to Korean Patent Application No. 10-2005-0031899, filed on Apr. 18, 2005. The entire contents of all of the above applications are hereby incorporated by reference.

BACKGROUND OF THE INVENTION

1. Field of the Invention

The present invention relates to an image display device, a method of controlling the same, and a network system.

2. Description of the Related Art

Recently, an image display device such as a television is capable of displaying a conventional analog broadcasting and a digital broadcasting. Especially, the image display device provides functions to remote-control a refrigerator, a washing machine, a heater, etc. in a home network system.

However, the image display device only provides functions to control operations of other external devices connected through a network, but can not provide a function to transmit video, audio, and additional information to other external device according to a user setup.

SUMMARY OF THE INVENTION

Accordingly, the present invention is directed to an image display device, a method of controlling the same, and a home network system that substantially obviate one or more problems due to limitations and disadvantages of the related art.

An object of the present invention is to provide an image display device transmitting a video data, an audio data, and an additional data to an external device according to a user setup.

Another object of the present invention is to provide an image display device transmitting data according to a channel of a broadcasting signal, a transmission time, and a type of an external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image display device including: a tuner receiving a broadcasting signal; a demux dividing the received broadcasting signal into a video data, an audio data, and an additional data; an audio processing unit processing the audio data; a video processing unit processing the video data; a display unit displaying the video data outputted from the video processing unit; a key input unit inputting a user command; a controller controlling an operation of the image display device according to an output of the key input unit and transmitting the broadcasting signal to an external device according to a user setup; a memory storing a transmission setup to transmit the broadcasting signal to the external device; and a communication unit communicating with the external device.

In another aspect of the present invention, there is provided an method of controlling an image display device, the method including: setting transmission conditions of a broadcasting signal, the transmission conditions including a broadcasting time, a transmission time and an external device to which the broadcasting signal is transmitted; and transmitting the broadcasting signal to the external device according to the transmission conditions.

In a further another aspect of the present invention, there is provided a home network system including: an image display unit transmitting a broadcasting signal including at least one of a video data, an audio data and an additional data according to predetermined transmission conditions; and at least one external device connected to the image display unit through a wire or wireless network to output the transmitted broadcasting signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating a configuration of an image display device according to an embodiment of the present invention;

FIG. 2 is view of an on-screen display (OSD) menu screen for a data transmission;

FIG. 5 is a flowchart illustrating a data transmission of an image display device according to an embodiment of the present invention.

DETAILED DESCRIPTION OF THE INVENTION

Figure 3:
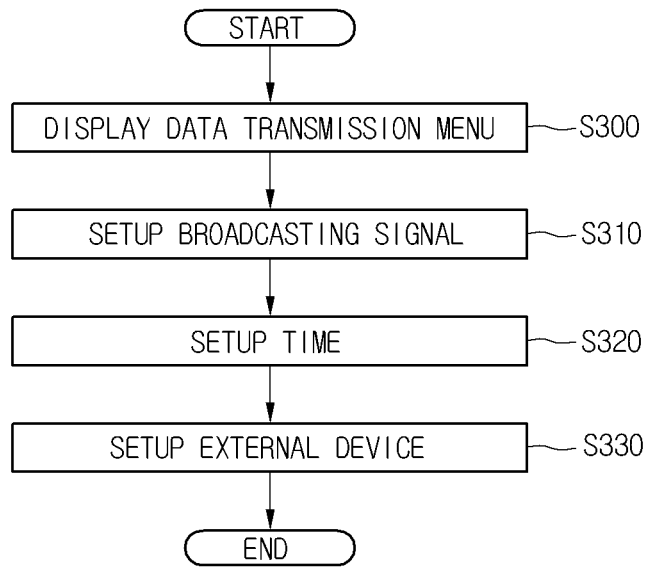
FIG. 3 is a flowchart illustrating a data transmission setup of an image display device according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The image display devices are connected to external devices through a wire or wireless network. The image display device can be a digital television and is operated as a master device. Additionally, external devices can be a refrigerator, a air conditioner, a monitor, a speaker, a mobile phone, a personal data assistant (PDA), a computer, etc. and is operated as a slave device.

The image display device controls an operation of an external device connected through a home network system, and outputs video data, audio data, and additional data through an external device according to a user setup.

FIG. 1 is a diagram illustrating a configuration of an image display device according to an embodiment of the present invention. The image display device and external devices are illustrated in FIG. 1.

The image display device 100 includes a tuner 101 receiving a broadcasting signal, a demux 102 dividing the received broadcasting signal from the tuner 101 into a video data, an audio data and an additional data, an audio processing unit 103 processing the audio data, a video processing unit 104 processing the video data, a display unit 106 displaying an outputted video data from the video processing unit 104, a key input unit 107 inputting a user command, a controller 108 controlling an operation of the image display device according to an output of the key input unit 107, a memory 109 in which the video data, the audio data, the additional data and the user setup are stored, and a communication unit 110 communicating with external devices.

Moreover, the image display device 100 may further include a speaker 104 or an audio data output terminal connected to an external speaker without the speaker 104.

An external device 200 may include a plurality of devices. For example, a first device 201 can be a personal data assistant (PDA); a second device 202 can be a refrigerator; a third device 203 can be a computer; and a fourth device 204 can be a mobile phone.

The image display device 100 and the external device 200 can send and receive data using a wire technology such as a home phoneline networking alliance (HomePNA), an IEEE1394, a power line communications (PLC), Ethernet, etc., and also using a wireless technology such as a Bluetooth, a home radio frequency (RF), an infrared data association (IrDA), etc. The communication unit 110 of the image display device 100 includes a communication module, and thus performs data communication with the selected external device 200 according to control of the controller 108.

A user inputs an operation command of the image display device 100 and sets a data transmission through the key input unit 107.

FIG. 2 is view of an on-screen display (OSD) menu screen for a data transmission.

A user can set the image display device 100 to transmit data according to a channel of a broadcasting signal, a transmission time, and a type of the external device 200.

More specifically, a radio channel number two can be set to be transmitted into a refrigerator between 10 a.m. to 12 a.m. Moreover, CNN news can be set to be transmitted into a PDA between 9 p.m. to 10 p.m. Additionally, a children quiz program can be set to be transmitted into a monitor between 7 p.m. to 8 p.m.

As described above, the setup for the data transmission is stored into the memory 109.

In this way, the image display device 100 transmits the broadcasting signal to the external device 200 connected through the home network according to the user setup.

The image display device 100 determines a transmission data according to the type of the selected external device 200. For example, a video data, an audio data, and an additional data are transmitted to a monitor with a speaker and a display unit. Additionally, an audio data is transmitted to an external device only with a speaker and without a display unit.

Even when there is an external device with a speaker and a display unit, only audio data is transmitted in case a transmittable data is only the audio data. For example, when a radio is transmitted into a monitor, only audio data is transmitted because there is no video data.

It can be set up that at least one of a broadcasting signal received in real time, a video data, an audio data, and an additional data, which are stored on the memory 109, can be selected and transmitted. Since a transmission time can be set, a real time transmission and a reservation transmission are possible.

On the other hand, a data transmission of the communication unit 110 is processed separated from a broadcasting signal displayed through display unit 106. That is, a currently-watching broadcasting signal and another broadcasting signal can be transmitted to the external device through the communication unit 110.

Additionally, the data transmission of the communication unit 110 can be achieved simultaneously with respect to a plurality of external devices, and the transmitted data can be transmitted differently according to each external device.

FIG. 3 is a flowchart illustrating a data transmission setup of an image display device according to an embodiment of the present invention.

Referring to FIG. 3, a user displays a data transmission setup menu in operation S300.

Then, a broadcasting signal to be transmitted is set in operation S310. That is, a channel to be transmitted is selected or a broadcasting signal stored in memory is selected.

Next, a transmission time is set in operation S320. By setting a current time, a wanted broadcasting signal can be transmitted immediately, at a reserved time and at an identical time on a daily basis.

Figure 4:
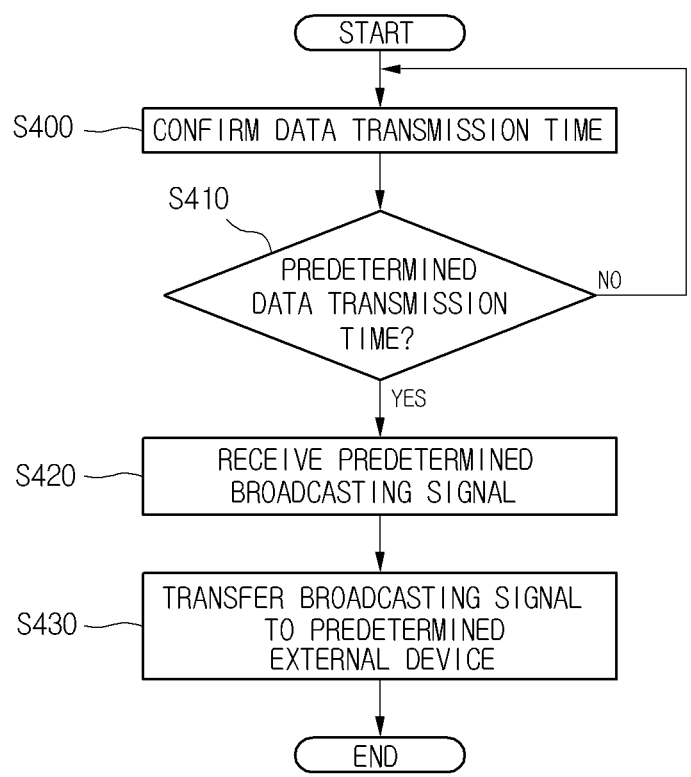
FIG. 4 is a flowchart illustrating a data transmission process of an image display device according to an embodiment of the present invention.

FIG. 4 is a flowchart illustrating a data transmission process of an image display device according to an embodiment of the present invention.

In operation S400, the image display device confirms whether a data transmission time is reached or not according to a data transmission setup stored in memory.

In operation S410, a predetermined broadcasting signal is received or a stored broadcasting signal is selected when a predetermined data transmission time is reached.

In operation S430, the broadcasting signal is transmitted to a predetermined external device through a communication unit.

FIG. 5 is a flowchart illustrating a data transmission of an image display device according to an embodiment of the present invention.

In operations S500 and S510, a received broadcasting signal is displayed when a user inputs a power-on command.

In operations S530, S540 and S550, when the user wants to transmit data or a predetermined transmission time is reached, the data is transmitted according to a setup condition.

Additionally, it is confirmed whether there is another data to be transmitted or not in operation S560. For example, the data can be transmitted simultaneously to a plurality of external devices.

In operation S570, the data is transmitted according to a transmission condition when there is another data to be transmitted.

In operation S580, it is terminated when the user input a power-off command.

As described above, the image display device transmits data to an external device according to user setup conditions, and controls at least one of a video data, an audio data and additional data to be outputted from an external device.

Accordingly, a video data, an audio data and an additional data included in a broadcasting signal can be transmitted in a space separated from space on which the image display device is located.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image display device, comprising:
at least one of a display unit and an audio output unit configured to output content;
an input unit configured to input transmission setup information including an external device identification of an external device toward which the content is transmitted, a channel identification of the content, and a transmission time to transmit the content;
a communication unit configured to transmit transmission data to the external device identified by the external device identification; and
a controller configured to:
control an operation of the image display device according to a control signal from the input unit, wherein the control signal indicates the received content is to be output to the external device rather than being output by the image display apparatus,
determine a format of the transmission data according to a type of the external device,
transmit the content identified by the channel number, at the transmission time and to the external device identified by the external device identification according to the determined format, and via the communication unit rather than the received content being output by the image display device based on the control signal.

2. The image display device according to claim 1, wherein the content includes data, the data being at least one of video data, audio data and additional data.

3. The image display device according to claim 2, wherein the format of the transmission data corresponds to a format of the data included in the content.

4. The image display device according to claim 1, wherein the content to be transmitted to the external device is content data stored in a memory.

5. The image display device according to claim 1, further comprising:
a memory configured to store the transmission setup information.

6. The image display device according to claim 1, wherein the communication unit is configured to transmit the transmission data to a plurality of external devices.

7. The image display device according to claim 6, wherein the communication unit is configured to transmit the transmission data in different formats according to types of the plurality of external devices.

8. A method of controlling an image display device, the method comprising:
inputting, via an input unit of the image display device, transmission setup information including an external device identification of an external device toward which the content is transmitted, a channel identification of the content, and a transmission time to transmit the content;
transmitting, via a communication unit of the image display device, transmission data to the external device identified by the external device identification;
controlling, via a controller of the image display device, an operation of the image display device according to a control signal from the input unit, wherein the control signal indicates the received content is to be output to the external device rather than being output by the image display apparatus;
determining, via the controller, a format of the transmission data according to a type of the external device; and
transmitting, via the communication unit, the content identified by the channel number, at the transmission time and to the external device identified by the external device identification according to the determined format, rather than the received content being output by the image display device based on the control signal.

9. The method according to claim 8, wherein the format of the transmission data corresponds to a format of the data included in the content.

10. The image method according to claim 8, wherein the content to be transmitted to the external device is content data stored in a memory.

11. The method according to claim 8, further comprising:
storing the transmission setup information.

* * * * *